United States Patent
Weaver et al.

(10) Patent No.: US 7,311,441 B2
(45) Date of Patent: Dec. 25, 2007

(54) POUCH CONSTRUCTION

(75) Inventors: Richard A. Weaver, Linden, MI (US); Christopher J. C. Zimmerman, Owosso, MI (US); Michael W. Czop, Fenton, MI (US); Joseph M. Wright, Fenton, MI (US); Wojciech M. Porcek, Davison, MI (US); Jeremy J. Weidner, Swartz Creek, MI (US); Daniel D. Hayes, Durand, MI (US); Samba Toure, Burton, MI (US); Michael Howe, Fenton, MI (US)

(73) Assignee: Contour Fabricators, Inc., Fenton, MI (US)

( * ) Notice: Subject to any disclaimer, the term of this patent is extended or adjusted under 35 U.S.C. 154(b) by 50 days.

(21) Appl. No.: 11/099,001

(22) Filed: Apr. 5, 2005
(Under 37 CFR 1.47)

(65) Prior Publication Data
US 2006/0131190 A1 Jun. 22, 2006

Related U.S. Application Data

(60) Provisional application No. 60/637,960, filed on Dec. 21, 2004.

(51) Int. Cl.
*B65D 33/00* (2006.01)
*B65D 85/00* (2006.01)

(52) U.S. Cl. .................................... 383/36; 206/320
(58) Field of Classification Search ................ 206/305, 206/320; 383/36, 61.1, 88–91
See application file for complete search history.

(56) References Cited

U.S. PATENT DOCUMENTS

| 2,246,596 | A | * | 6/1941 | Moore .......................... 383/89 |
| 3,746,215 | A | * | 7/1973 | Ausnit et al. ................. 383/36 |
| 5,030,013 | A | * | 7/1991 | Kramer ...................... 383/61.1 |
| 5,715,943 | A | * | 2/1998 | Thompson, Jr. ............. 383/91 |
| 6,273,608 | B1 | * | 8/2001 | Ward et al. .................. 383/33 |
| 6,527,444 | B1 | * | 3/2003 | Buchman ..................... 383/36 |
| 6,817,470 | B1 | * | 11/2004 | Goldberg .................... 206/320 |

* cited by examiner

*Primary Examiner*—Luan K Bui
(74) *Attorney, Agent, or Firm*—John K. McCulloch

(57) ABSTRACT

Apparatus for enabling the use of a computer mouse at a sterile surgical site comprises a pouch for the accommodation of the mouse and an inlet sleeve forming an inlet passage into the pouch. The pouch and sleeve are formed of pliable, preferably transparent sterilizable material. When the mouse has been admitted to the pouch via the passage, the sleeve may be separated from the pouch and the open mouth of the latter rolled to form a seal, thereby retaining the mouse within the pouch.

13 Claims, 4 Drawing Sheets

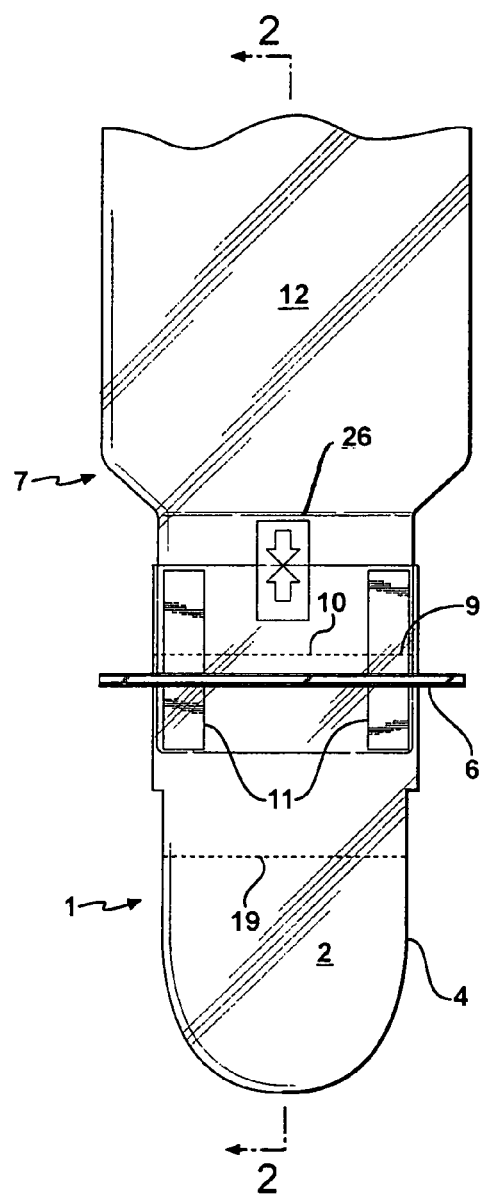
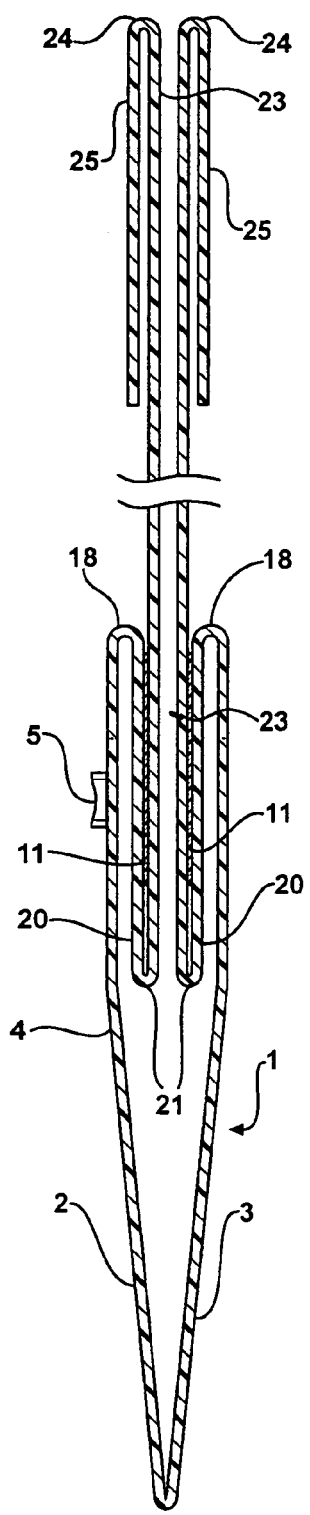
FIG - 1
FIG - 2

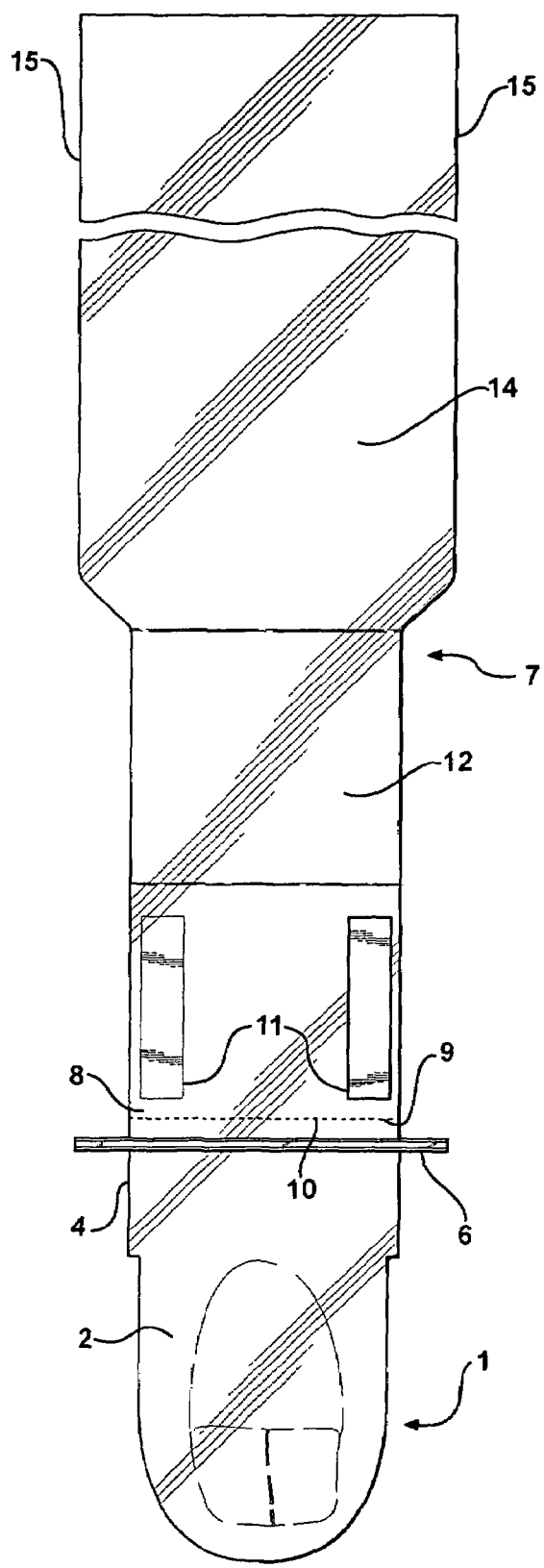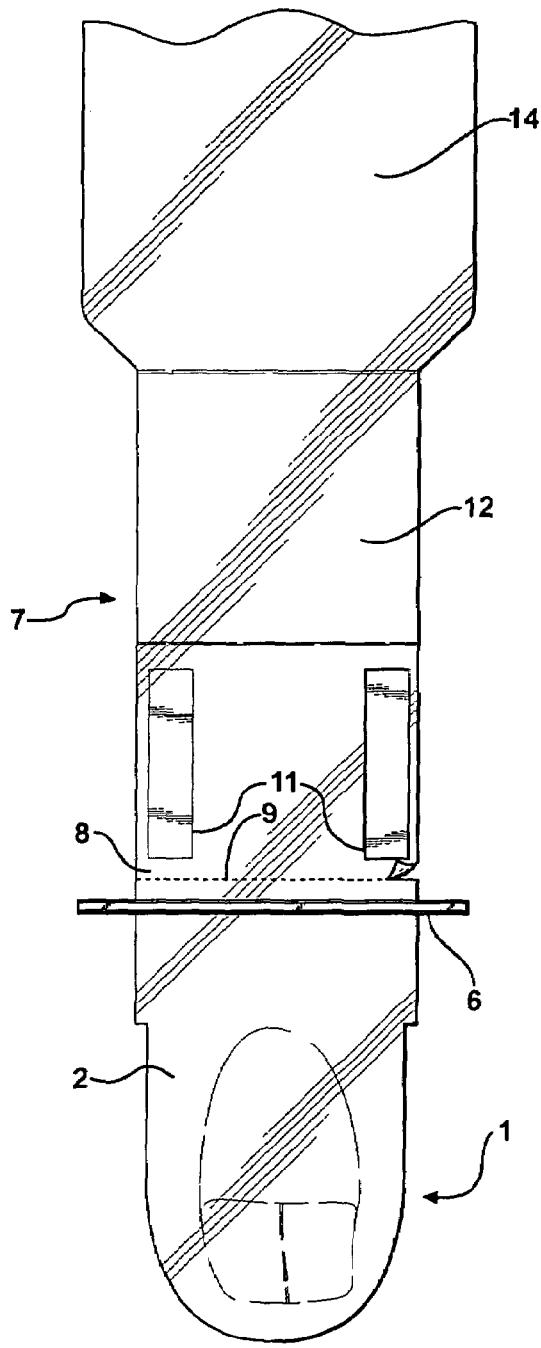
FIG - 3
FIG - 4

POUCH CONSTRUCTION

CROSS REFERENCE TO RELATED APPLICATION

This application claims the benefit of the filing date of U.S. Provisional Application No. 60/637,960, titled Pouch Construction, filed Dec. 21, 2004.

This invention relates to a pouch for accommodating a non-sterile object, such as a cordless computer mouse, in a sterile environment without contaminating such environment.

BACKGROUND OF THE INVENTION

In performing surgical procedures it is not uncommon for a surgeon or technician to use a computer for displaying a surgical site via a monitor. The surgical site often must be displayed in more than one position and changes in positions are effected by means of a cordless computer mouse. It is very difficult to sterilize the mouse, so it is proposed to provide a container, such as a pliable pouch formed of sterilizable material, in which the mouse may be sealed. The exterior of the pouch can be sterilized, thereby enabling the mouse to be used in a sterile environment without contaminating the latter.

SUMMARY OF THE INVENTION

A pouch constructed in accordance with the invention comprises a receptacle or bag formed of sterilizable, polymer material, the bag being closed except for an open mouth at one end. The mouth end of the bag is integrally, but separably, secured to one end of an inlet sleeve which is sufficiently pliable to enable a portion of the sleeve adjacent the mouth of the pouch to be telescopingly accommodated within the bag and provide a passageway into the pouch. The opposite end of the sleeve is telescoped over the adjacent end portion of the sleeve to form an external cuff for facilitating holding the pouch in a position to enable the mouse to be introduced into the pouch by gravity.

Following insertion of the mouse in the receptacle the sleeve and receptacle are separated and the mouth of the receptacle convolutely rolled to form a seal. The roll is maintained in sealed condition by a flexible, form stable, bendable retainer.

THE DRAWINGS

A pouch constructed in accordance with the invention is illustrated in the accompanying drawings wherein:

FIG. 1 is a fragmentary elevational view illustrating a pouch assembled with a telescoping inlet sleeve;

FIG. 2 is an enlarged longitudinal sectional view taken on the line 2-2 of FIG. 1;

FIG. 3 is a plan view, on a reduced scale, showing the inlet sleeve in its fully extended condition;

FIG. 4 is a fragmentary view similar to FIG. 3 illustrating the sleeve in an initial stage of separation from the pouch;

THE PREFERRED EMBODIMENT

Figure 6:
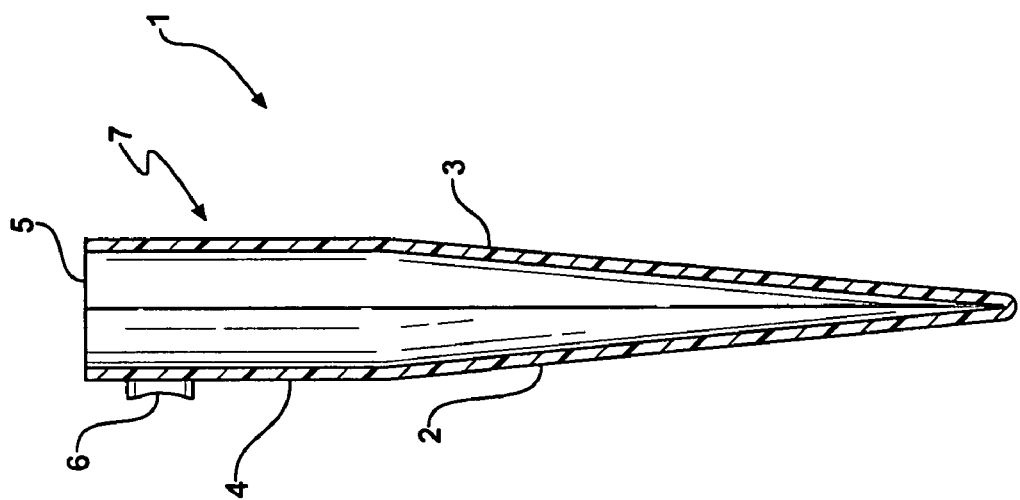
FIG. 6 is an enlarged side elevational view of the pouch omitting the mouse.
Figure 5:
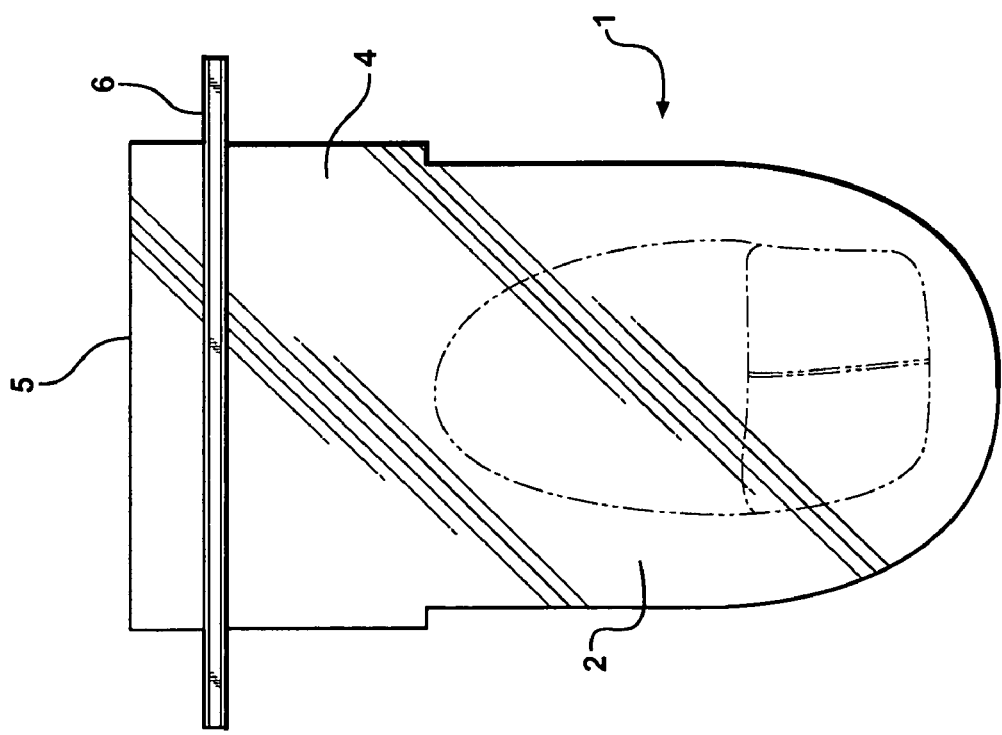
FIG. 5 is an elevational view of the pouch following separation of the sleeve.

A pouch constructed in accordance with the preferred embodiment of the invention is indicated by the reference character 1 and comprises overlying sheet sections 2 and 3 of pliable, sterilizable material such as polyethelene forming a hollow receptacle or bag 4 having an open mouth 5. The bag is of such size as to accommodate a cordless computer mouse M of known construction. Adjacent the mouth end of the bag is secured a form-stable, but bendable sealing strap 6 which extends beyond both sides of the bag. The strap may be used in the manner subsequently described to seal the mouth end of the bag.

The bag includes a unitary inlet sleeve 7 having a first or end section 8 initially joined to the receptacle along a weakening line 9 encircling the receptacle and formed by perforations 10 which facilitate separation of the sleeve from the bag when desired.

Spaced a short distance from the weakening line and in a direction away from the receptacle is a pair of thin, flexible, axially extending reinforcing splints 11, formed of polyester film such as Mylar. The strips are adhered to the section 8 of the sleeve 7 and are parallel and laterally spaced apart. The purpose of the splints will be explained shortly.

An intermediate section 12 of the sleeve extends beyond the weakening line 9 in a direction away from the receptacle 4 and is integrally joined to a sleeve end section 14 having a diameter greater than that of the intermediate section 12. Opposite sides of the end section 14 are sealed, but the ends of the section are free of one another.

When the parts of the apparatus are in the positions shown in FIGS. 1 and 2, the sides 2 and 3 of the receptacle 4 confront one another, and the intermediate section 12 is reversely and inwardly turned or folded as at 18 and telescoped via the open mouth 5 into the receptacle a substantial distance as indicated by the fold line 19. The telescoped portion of the sleeve within the bag forms sides 20 which lie alongside and inwardly of the sides 2 and 3 of the bag. The telescoped portion of the sleeve is reversely turned or folded at 21 and extended beyond the turn 18 to form a passage 23 therebetween. The upper end portion 14 of the sleeve 7 is reversely turned or folded outwardly at 24 to form a downwardly extending external cuff 25. The passage 23 extends from the fold 24 to the fold 21 within the bag 4.

Following folding and telescoping the various sections of the sleeve to produce the compact construction shown in FIG. 1, a separable retainer strip 26 is secured in bridging relation to the sections 18 and 12. The strip 26 prevents inadvertent withdrawal of the telescoped sleeve section from the bag.

The apparatus is shipped and stored in the condition shown in FIGS. 1 and 2 in sterile condition and within a sterile container (not shown). When it is desired to make use of the apparatus, it is removed from its container in a sterile atmosphere. A sterile nurse or attendant slips his hands in the cuff 25. The attendant then may move his hands apart so as to open the passage 23. A cordless, computer mouse M, which usually is not sterilized, is introduced to the upper end of the passage 23 and slides downwardly into the bag 4. During the passage of the unsterilized mouse it may contaminate the inner surfaces of the passage 23 and the inner surfaces of the bag walls 2 and 3. However, it does not contaminate the exterior of the bag or the inlet sleeve.

Following the lodging of the mouse in the bag 4, the assembly may be placed on a sterile pad and air from within the bag exhausted, usually manually. A force then may be applied on the upper end of the sleeve in a direction away from the bag so as to break the retainer 26 and withdraw the telescoped portion of the sleeve from the interior of the bag. As the telescoped portion of the sleeve is withdrawn from the bag, the splints 11 will be turned end for end, and inwardly of the sleeve, thereby drawing the confronting sides of the sleeve toward one another and maintaining closure of the passage 23 during continued upward movement of the sleeve. The mouth end of the bag then may be rotated to form a roll 27 which provides a closure transversely of the bag, thereby sealing the bag adjacent its mouth 5.

When the telescoped portion of the sleeve is fully withdrawn from the bag, the application of a further force in the same direction will cause the sleeve to separate from the bag at the perforations 10 (as indicated in FIG. 4), thereby separating the sleeve from the bag while the mouth 5 remains closed by the roll 27. By this time, the splints 11 will be at a position beyond that of the perforations 10 as shown in FIG. 4.

Figure 8:
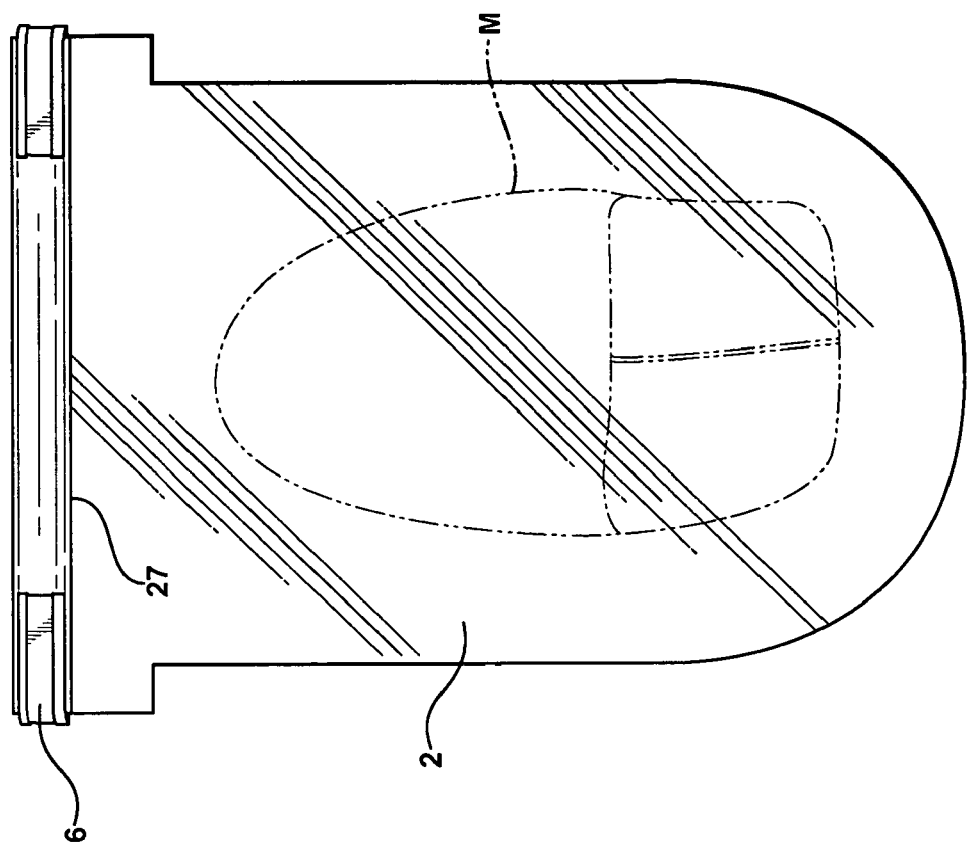
FIG. 8 is an elevational view of the sealed pouch.
Figure 7:
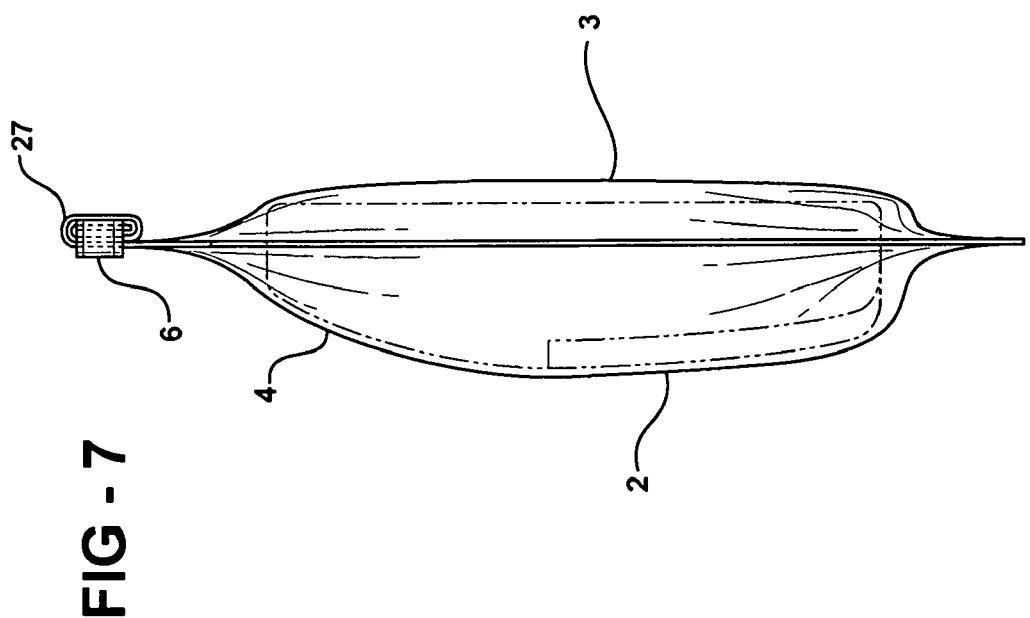
FIG. 7 is a side elevational view illustrating the pouch in sealed condition with the mouse in the pouch.

Following separation of the sleeve from the bag the roll 27 may be further wound to ensure maintaining a secure seal at the mouth end of the bag. Following completion of the roll, the ends of the sealing strap 6 may be folded over opposite ends of the roll, as shown in FIG. 8, so as to clamp the ends of the roll and maintain the seal.

The arrangement is such that, although the mouse may not be sterile, it is sealed within a pouch the exterior of which is sterile, thereby enabling use of the computer at the surgical site without contaminating the site.

Following the surgical procedure the sealing roll 27 may be unwound and the mouse retrieved. The pouch-forming parts then may be discarded.

The disclosed embodiment is representative of a presently preferred form of the invention, but is intended to be illustrative rather than definitive thereof. The invention is defined in the claims.

We claim:

1. A pouch for accommodating an object comprising a bag formed of pliable material forming a receptacle, said receptacle being closed except for a mouth at one side thereof; and a tubular sleeve joined to said receptacle and extending beyond said mouth, said sleeve being reversely turned inwardly at a position beyond said mouth to form a first portion telescoped into said receptacle via said mouth, said first portion being reversely turned at a position within said receptacle and inward of said mouth to form a second portion in telescoped relation with said first portion and extending outward of and beyond said receptacle via said mouth, said first and second portions forming a passage along which an object may travel into said receptacle, said first and second portions of said sleeve being separable from said receptacle at a position beyond said mouth following entry of an object into said receptacle via said passage.

2. The pouch according to claim 1 wherein said pliable material is sterilizable.

3. The pouch according to claim 1 wherein the juncture of said first portion of said sleeve and said receptacle is weakened to facilitate separation of said sleeve from said receptacle.

4. The pouch according to claim 1 including a form-stable, bendable sealing strap secured to said receptacle adjacent said mouth arid externally of said receptacle, said strap being of such length as to extend beyond opposite edges of said receptacle.

5. The pouch according to claim 4 wherein the material of said receptacle is sufficiently pliable to be convolutely wound about said strap and form a sealing roll, and wherein said strap is sufficiently flexible to be bent and clamped about opposite ends of said roll.

6. The pouch according to claim 1 including at least one reinforcing splint secured to said sleeve and said receptacle and extending axially beyond the junction of said sleeve and said receptacle.

7. The pouch according to claim 6 including two of said reinforcing splints parallel to and laterally spaced from one another.

8. The pouch according to claim 1 wherein said sleeve has an end portion external of said receptacle, said end portion being reversely turned to form an external cuff.

9. The pouch according to claim 1 including separable retainer means bridging said receptacle and said second portion of said sleeve for minimizing inadvertent withdrawal of said first portion of said sleeve from said receptacle.

10. The pouch according to claim 1 wherein said sleeve is a unitary extension of said receptacle.

11. A pouch comprising at least one sheet of pliable material forming a receptacle closed except for an open mouth at one end thereof; and closing means for said open mouth, said closing means comprising a flexible, form-stable strap secured to said receptacle at its exterior adjacent said mouth and extending beyond opposite sides of said receptacle, the material from which said sheet is formed being sufficiently pliable to enable the sheet at said open mouth and said strap to be convolutely wound to form a roll, said strap being of such flexibility as to have its opposite ends reversely turned following the forming of said roll and clamp opposite ends of said roll thereby sealing said mouth, said sheet including an inlet sleeve joined at one end thereof to said receptacle at said mouth and extending beyond said receptacle, said sleeve having a first portion thereof adjacent said mouth, said first portion being reversely turned inwardly and telescopingly extended into said receptacle via said mouth, said first portion of said sleeve being reversely turned within said receptacle inward of said mouth to form a sleeve section extending from within said receptacle outwardly thereof through and beyond said mouth, said first portion of said sleeve being weakened adjacent said mouth to facilitate separation of said sleeve from said receptacle.

12. The pouch according to claim 11 wherein said sleeve has an end portion remote from said receptacle reversely turned outwardly of said sleeve to form an external cuff.

13. The pouch according to claim 11 including separable retaining means releasably joining said sleeve section and said receptacle adjacent said mouth.

* * * * *

UNITED STATES PATENT AND TRADEMARK OFFICE
CERTIFICATE OF CORRECTION

PATENT NO. : 7,311,441 B2 Page 1 of 1
APPLICATION NO. : 11/099001
DATED : December 25, 2007
INVENTOR(S) : Richard A. Weaver et al.

It is certified that error appears in the above-identified patent and that said Letters Patent is hereby corrected as shown below:

Column 4, claim 4, line 3, change "arid" to -- and --.

Signed and Sealed this

Twenty-ninth Day of April, 2008

JON W. DUDAS
*Director of the United States Patent and Trademark Office*